(12) United States Patent
Takamura

(10) Patent No.: US 6,374,157 B1
(45) Date of Patent: Apr. 16, 2002

(54) ROBOT DEVICE AND CONTROL METHOD THEREOF

(75) Inventor: Seiichi Takamura, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/700,984

(22) PCT Filed: Nov. 25, 1999

(86) PCT No.: PCT/JP99/06588

§ 371 Date: Nov. 22, 2000

§ 102(e) Date: Nov. 22, 2000

(87) PCT Pub. No.: WO00/32360

PCT Pub. Date: Jun. 8, 2000

(30) Foreign Application Priority Data

Nov. 30, 1998 (JP) ............................................ 10-340715
May 10, 1999 (JP) ............................................ 11-129277

(51) Int. Cl.[7] ............................................ G06F 19/00
(52) U.S. Cl. ........................ 700/245; 700/251; 700/259; 700/275; 701/23; 701/25; 701/167; 701/169; 318/568.12; 318/587; 901/1; 901/3; 901/9
(58) Field of Search ................................ 700/245, 275, 700/251, 259; 701/200, 167, 169, 23, 25, 208, 220; 318/587; 901/1, 3, 9

(56) References Cited

U.S. PATENT DOCUMENTS

| | | | | |
|---|---|---|---|---|
| 4,119,900 A | * | 10/1978 | Kremnitz | 701/23 |
| 4,556,940 A | * | 12/1985 | Katoo et al. | 701/25 |
| 4,628,454 A | * | 12/1986 | Ito | 701/25 |
| 4,674,048 A | * | 6/1987 | Okumura | 701/25 |
| 4,782,447 A | * | 11/1988 | Ueno et al. | 701/208 |
| 4,817,000 A | * | 3/1989 | Eberhardt | 701/200 |
| 5,001,635 A | * | 3/1991 | Yasutomi et al. | 701/25 |

FOREIGN PATENT DOCUMENTS

| | | | |
|---|---|---|---|
| DE | 23 64 002 A1 | * | 12/1973 |
| DE | 31 35 117 A1 | * | 5/1981 |
| EP | 0 142 594 A1 | * | 5/1985 |
| EP | 0 236 614 A2 | * | 9/1987 |
| EP | 0816986 | | 2/1997 |
| JP | 5-318348 | | 12/1992 |
| JP | 5-169378 | | 7/1993 |
| JP | 7-311082 | | 11/1995 |
| JP | 10-113343 | | 5/1998 |
| JP | 10-149445 | | 6/1998 |
| JP | 10-217174 | | 8/1998 |

OTHER PUBLICATIONS

Mukai et al., Recovery of shape and scale of an object using a CCD camera and acceleration–gyro sensor, 1999, IEEE, pp. 70–76.*

DENSO, Denso Technology 2000, Internet, pp. 1–21.*

Dejan Mitrovic, Supporting navigation decision making by learning driving patterns, 1999, Internet.*

Borenstein et al., Mobile robot positioning sensors and techniques, 1997, Internet, pp. 232–249.*

\* cited by examiner

Primary Examiner—William A. Cuchlinski, Jr.
Assistant Examiner—McDieunel Marc
(74) Attorney, Agent, or Firm—Rader, Fishman, & Grauer (57) ABSTRACT

Acceleration information, rotation angle information and rotation angular velocity information are detected by an acceleration sensor and a rotation angle sensor, and detected signals are stored into a storage section in time series. Specific information such as dispersion is calculated from the stored time series signals, and the state of the robot device is determined from the specific information. When it is detected as the state of the robot device that the robot device is lifted up, the movement of a predetermined movable part which acts to the outside is stopped.

14 Claims, 9 Drawing Sheets

ROBOT DEVICE AND CONTROL METHOD THEREOF

TECHNICAL FIELD

This invention relates to a robot device and a control method for the same, and is suitably applied to a robot device which takes natural actions and a control method for the same.

BACKGROUND ART

Conventionally, there have been various proposals for causing a robot device to take natural actions.

For example, in the Japanese Publication of Utility Model Application No.H5-72630, there is proposed a movement stop sensor of a moving body which discriminates whether the moving body is travelling or stopped, by discriminating whether a voltage obtained by performing high-pass filter processing on a signal measured by an acceleration sensor mounted on the moving body is greater than a predetermined threshold value.

However, since such a movement stop sensor of the moving body has the acceleration sensor mounted only at one location in the travelling direction of the moving body, the shift on an inclined surface and rotational movement cannot be discriminated.

Meanwhile, in the Japanese Publication of Unexamined Patent Application No. H10-113,343, method, device and system for recognizing actions and behaviors are proposed. In such a system, a signal obtained from a measuring device mounted on a subject is frequency-converted to calculate a characteristic quantity, and the correlation between the calculated characteristic quantity and the database is taken, thereby recognizing actions and behaviors.

However, with such recognition method, device and system, correct recognition cannot be carries out if the database is insufficient or inappropriate, and the preparation of a sufficient database to avoid such a situation requires much time, technical knowledge and experience.

DISCLOSURE OF THE INVENTION

In view of the foregoing status of the art, it is an object of the present invention to provide a robot device which can easily recognize its own status such as a shift on an inclined surface or a rotational movement and can act by itself, and a control method for the same.

Specifically, a robot device according to the present invention includes: detection means for detecting the acceleration and/or the rotation angular velocity by an acceleration sensor and/or a gyro sensor; storage means for storing, in time series, signals detected by the detection means as time series signals; calculation means for calculating specific information from the time series signals stored in the storage means; recognition means for recognizing its own state from the specific information calculated by the calculation means; and output means for outputting an action based on its own state recognized by the recognition means.

Thus, in the robot device, the specific information is calculated using the detected acceleration and rotation angular velocity, and its own state is automatically recognized so as to take an action on the basis of the calculated specific information.

Moreover, in the robot device, if its own state recognized by the recognition means is a state of being lifted up, the operation of a predetermined movable part which acts to the outside is stopped.

Thus, in the robot device, occurrence of an injury to the user due to the operation of the movable part which acts to the outside can be prevented.

Also, a control method for a robot device according to the present invention includes: a first step of detecting the acceleration and/or the rotation angular velocity by an acceleration sensor and/or a gyro sensor; a second step of storing, in time series, signals obtained by detection as time series signals; a third step of calculating specific information from the stored time series signals; a fourth step of recognizing its own state from the calculated specific information; and a fifth step of controlling an action of the robot device on the basis of its own recognized state.

Thus, in the control method for a robot device, its own state is automatically recognized so as to control the action of the robot device, thereby controlling the action of the robot device in accordance with a change in its own state.

Moreover, in the control method for a robot device, the operation of a predetermined movable part which acts to the outside is stopped if its own recognized state is a state of being lifted up.

Thus, in the control method for a robot device, occurrence of an injury to the user due to the operation of the movable part which acts to the outside can be prevented.

BEST MODE FOR CARRYING OUT THE INVENTION

A preferred embodiment of the present invention will now be described in detail with reference to the drawings.

(1) Structure of Robot Device According to the Present Embodiment

Figure 1:
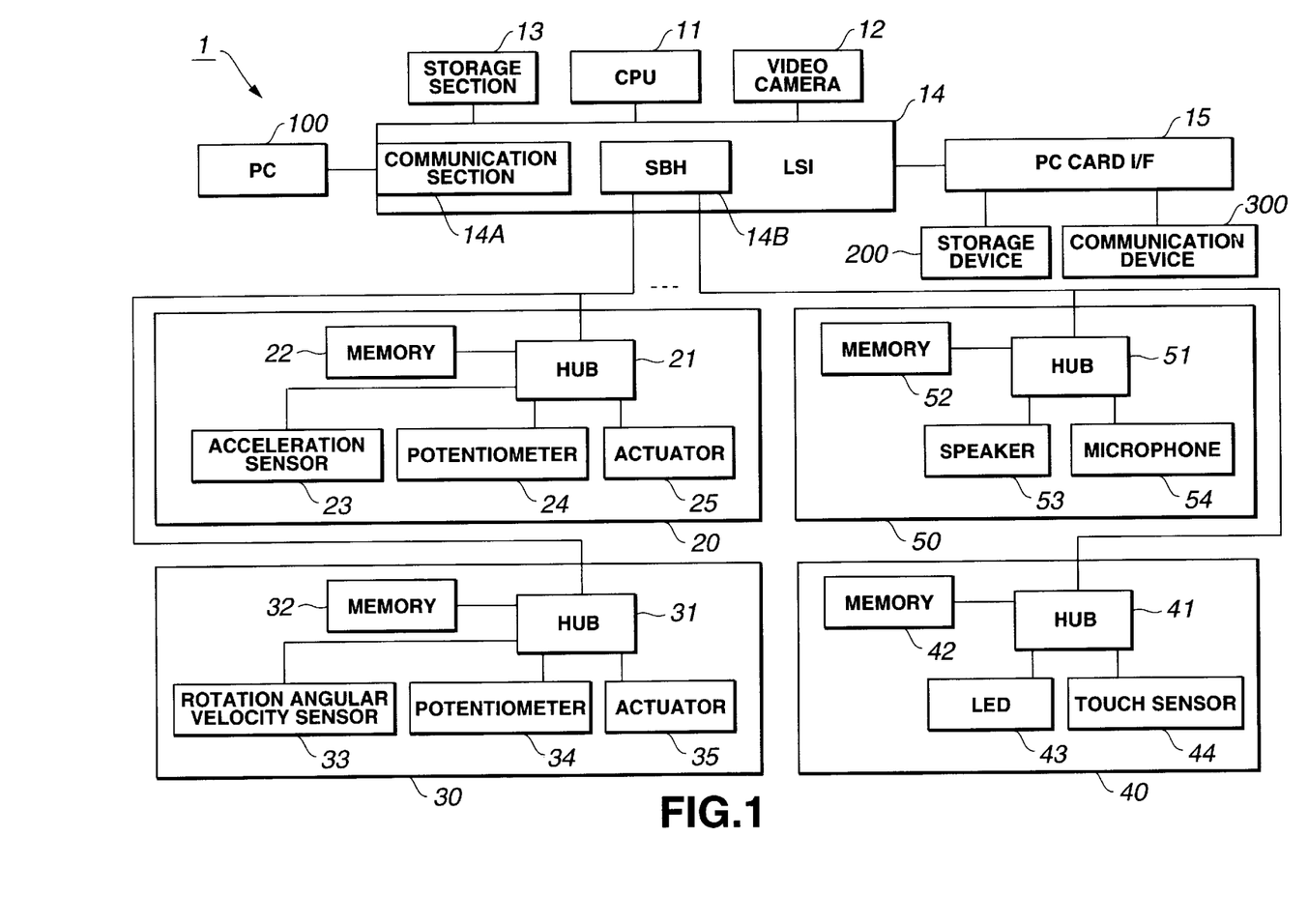
FIG. 1 is a block diagram showing the structure of a robot device according to the present invention.

A robot device 1 of this embodiment is constituted as shown in FIG. 1 as a whole. The robot device 1 includes a central processing unit (hereinafter referred to as CPU) 11 for controlling the entire system, a video camera 12 having a CCD (charge coupled device) image sensor, a storage section 13 for storing video data from the video camera 12, and a large-scale integrated circuit (hereinafter referred to as LSI) 14 which collectively includes a host controller of a serial bus and the like.

The LSI 14 has a communication section 14A constituted by an interface for serial communication, parallel communication or USB communication, and is connected to an external personal computer 100 via the communication section 14A. In this case, the personal computer 100 can change a program for causing the CPU 11 to operate or can manipulate the CPU 11 via the LSI 14.

The LSI 14 has a PC card interface 15 and is thus connected to various devices of the PC card standard, for example, a storage device 200 such as an ATA (advanced technology attachment) flash memory card and a communication device 300 such as a radio communication card.

The LSI 14 has a timer, not shown, for obtaining real-time information, and a battery manager, not shown, for managing the remaining quantity of the battery and for carrying out control in cooperation with the timer so as to turn on the power at a certain time point.

The robot device 1 also has first to fourth CPC (configurable physical component) devices 20, 30, 40 and 40, which constitute limbs, ears and mouth. Each CPC device is connected to a serial bus hub (SBH) 14B in the LSI 14. While the four CPC devices are shown in this embodiment, it is a matter of course that the number of CPC devices is not particularly limited.

The first CPC device 20 has a hub 21 for controlling each circuit within the device in response to a control command from the LSI 14, a memory 22 for temporarily storing a control signal and a detection signal, an acceleration sensor 23 for detecting the acceleration, a potentiometer 24, and an actuator 25 which serves as a junction or the like. The acceleration sensor 23 detects the acceleration in three axial directions (X-axis, Y-axis, Z-axis) by several ten milliseconds and supplies the results of detection to the CPU 11 via the hub 21 and the serial bus hub 14B.

The second CPC device 30 has a hub 31, a memory 32, a rotation angular velocity sensor 33 made up of a gyro sensor for detecting the rotation angular velocity, a potentiometer 34, and an actuator 35. The rotation angular velocity 33 detects the rotation angular velocity in three angular directions (angle R, angle P, angle Y) by several ten milliseconds and supplies the results of detection to the LSI 14 via the hub 31 and the serial bus hub 14B.

The third CPC device 40 has a hub 41, a memory 42, a light-emitting diode (LED) 43 for emitting a light to indicate the reception of an external stimulus, and a touch sensor 44 for detecting whether the exterior is touched or not.

The fourth CPC device 50 has a hub 51, a memory 52, a speaker 53 which serves as a "mouth" for outputting a sound to the outside, and a microphone 54 which serves as an "ear" for detecting an external sound.

Figure 2:
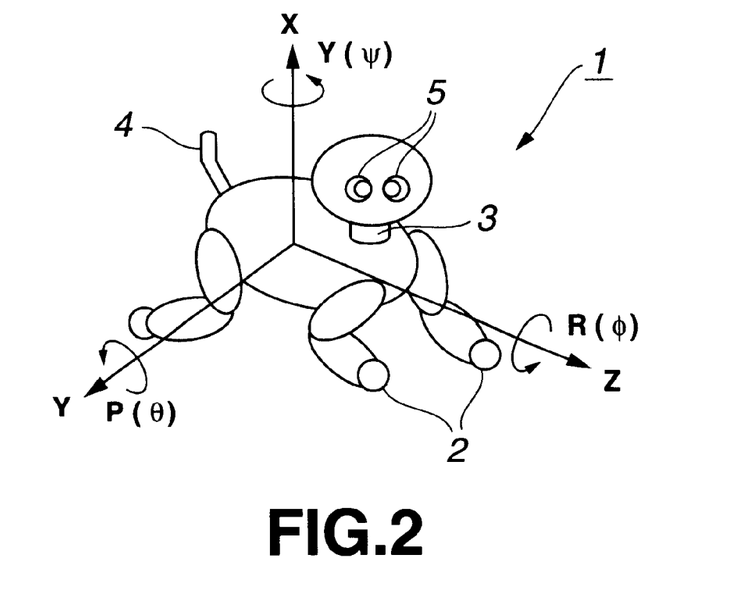
FIG. 2 is a perspective view showing the appearance of the robot device.

As the appearance is shown in FIG. 2, the robot device 1 is a multi-limb walking robot. Specifically, the robot device 1 is a multi-joint robot of a multi-limb walking type and is in the shape of an animal having four limbs 2.

Figure 3:
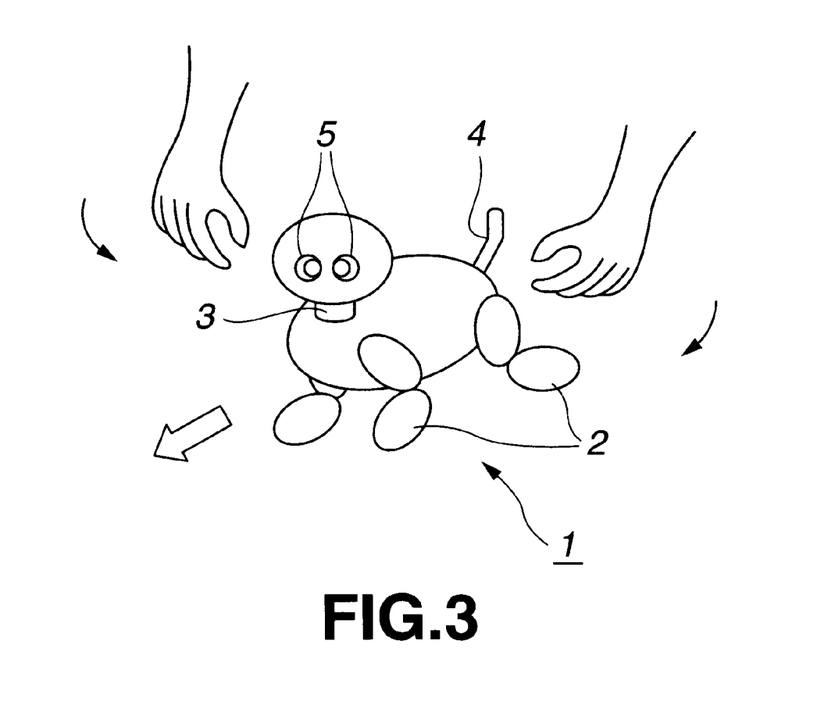
FIG. 3 is a schematic view for explaining the state where the robot device is walking.
Figure 4:
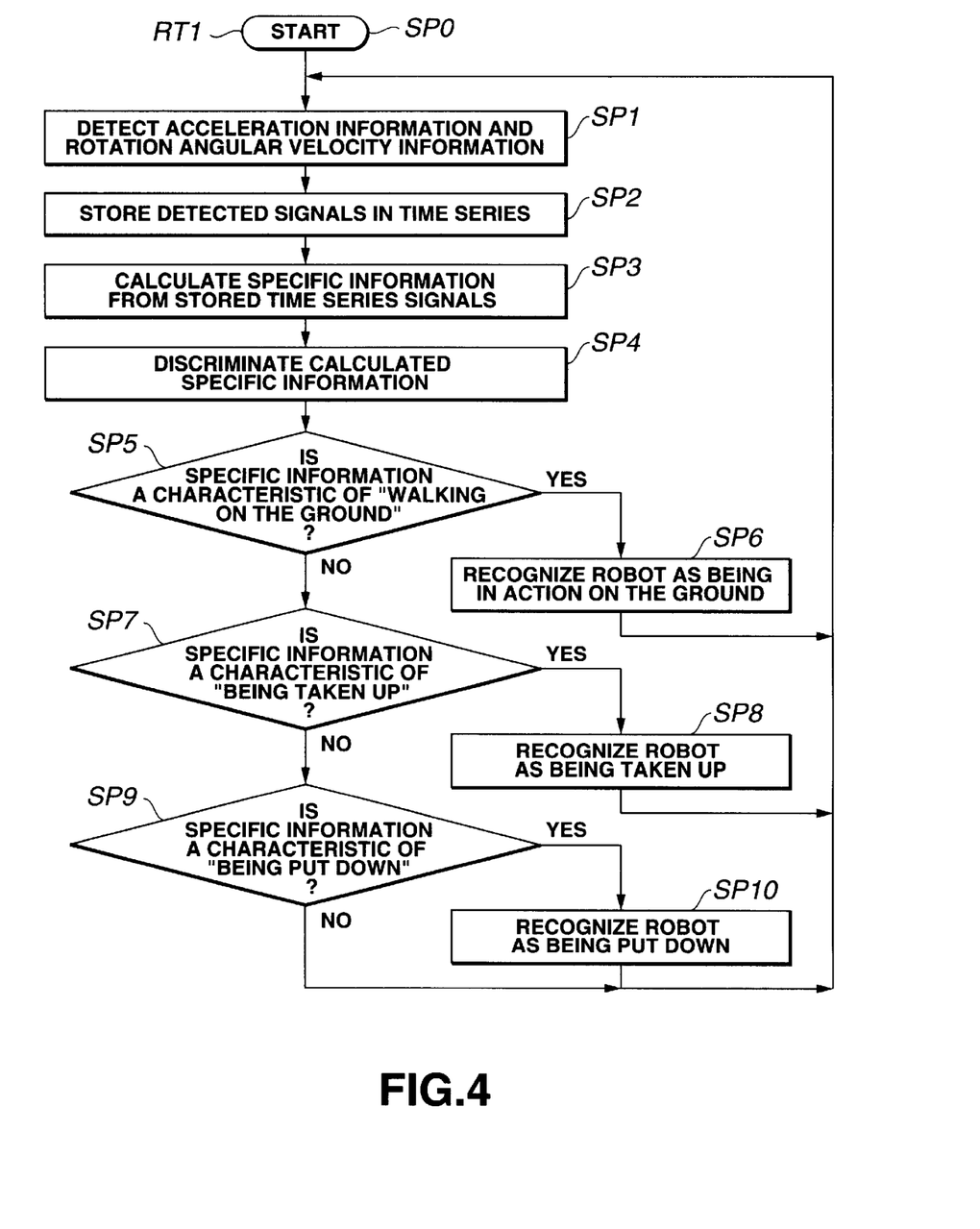
FIG. 4 is a flowchart illustrating the state recognition processing procedure.

As shown in FIG. 3, when such a robot device 1 is walking, the CPU 11 monitors the state of the robot device 1 in accordance with the state recognition processing procedure RT1 shown in FIG. 4.

Specifically, as the state recognition processing procedure RT 1 starts at step SP0, the CPU 11 receives acceleration information and rotation angular velocity information detected by the acceleration sensor 23 and the rotation angular velocity sensor 33 at step SP1, and then proceeds to step SP2 to store the acceleration information and the rotation angular velocity information into the storage section 13 in time series.

Next, at step SP3, the CPU 11 calculates specific information from the time series signals stored in the storage section 13. For example, the CPU 11 calculates the sum for the three axes (X-axis, Y-axis, Z-axis) from the time series signals of the acceleration sensor 23 stored in the storage section 23, as a representative dispersion value in the acceleration sensor 23. Similarly, the CPU 11 calculates the sum for the three angles (angle R, angle P, angle Y) from the time series signals of the rotation angular velocity sensor 33, as a representative dispersion value, if necessary.

Then, at step SP4, the CPU 11 discriminates the specific information such as the calculated dispersion values.

Figure 5:
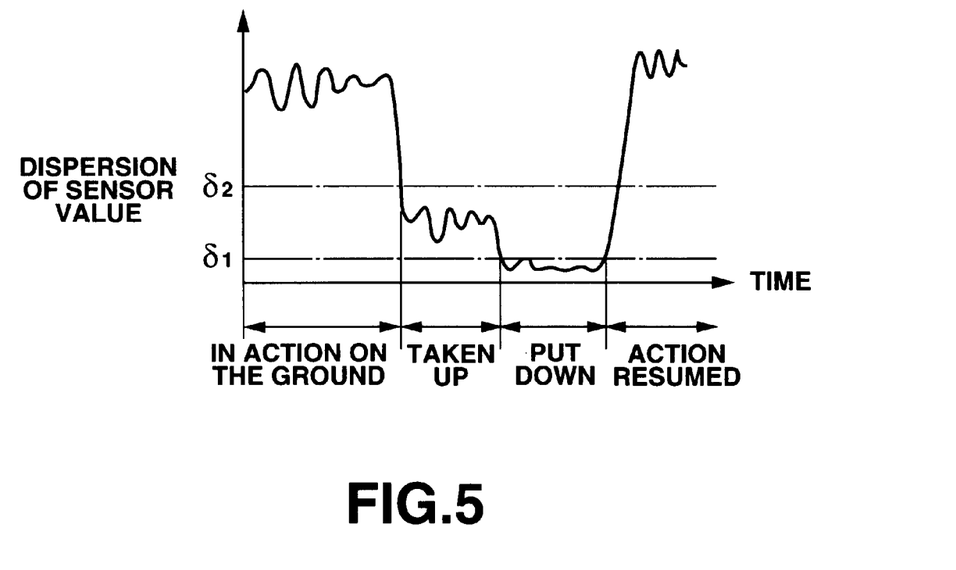
FIG. 5 is a graph for explaining a dispersion value in various states of the robot device.

FIG. 5 shows an exemplary dispersion value of the detection output of the acceleration sensor 23 and the rotation angular velocity sensor 33. The dispersion value has such a characteristic that it takes the maximum value when the robot device 1 is in action on the ground and that the value is gradually reduced when the robot device 1 is lifted up and then put down. Therefore, by setting an appropriate threshold value for a state change, it is possible to determine whether the robot device 1 is walking, lifted up, or put down, on the basis of the dispersion value. In FIG. 5, the CPU 11 can determine that the robot device 1 is in action on the ground when the dispersion value is not less than $\delta 2$, that the robot device 1 is lifted up when the dispersion value is not less than $\delta 1$ and less than $\delta 2$, and that the robot device 1 is put down when the dispersion value is less than $\delta 1$. Such specific determination is carried out at step SP5 and the subsequent steps, which will be described later.

Figure 6:
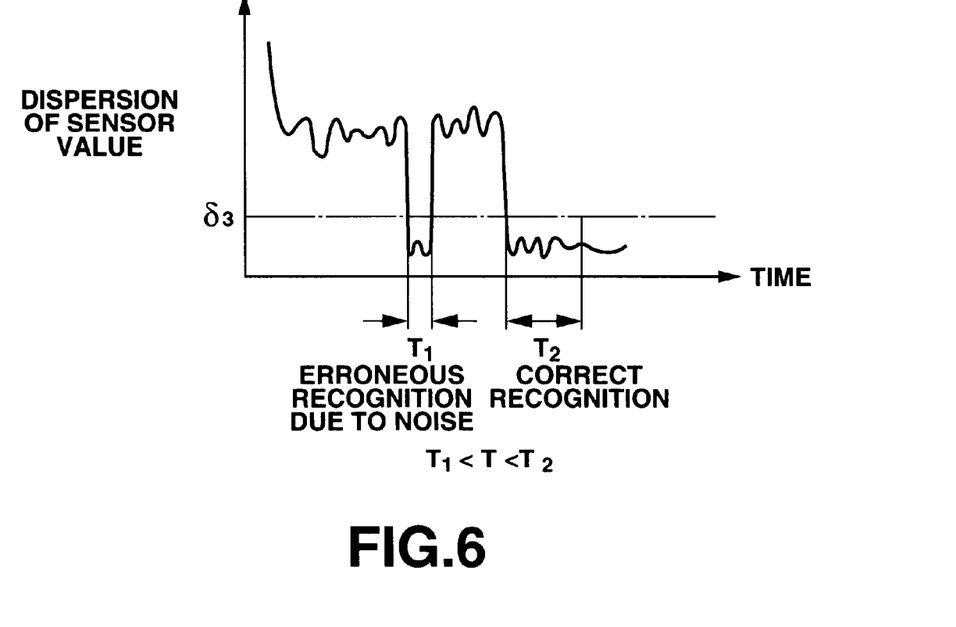
FIG. 6 is a graph for explaining erroneous recognition of the state due to a noise.

The CPU 11 might erroneously recognize a state change because of an abrupt change of the dispersion value due to a noise. In order to prevent such erroneous recognition, the CPU 11 determines the relation between the dispersion value and a threshold value $\delta 3$, and regards that an actual state change has occurred if the relation between the dispersion value and the threshold value $\delta 3$ has been kept constant for a predetermined time period or longer, as shown in FIG. 6. For example, the CPU 11 can set a predetermined time period T in advance, then determine that erroneous recognition due to a noise is made when the dispersion value exceeds the threshold value $\delta 3$ for a time period T1 (<T), and correctly recognize that the state has changed when the dispersion value exceeds the threshold value $\delta 3$ for a time period T2 (>T). Thus, the robust recognition function against noise can be realized. The threshold value $\delta 3$ is equivalent to the above-described $\delta 1$ and $\delta 2$.

Moreover, the CPU 11 constantly calculates the dispersion value of the acceleration sensor 23 and, if necessary, also calculates the dispersion value of the rotation angular velocity sensor 33. Thus, the robustness of recognition can be improved without much increasing the processing burden on the CPU 11.

Specifically, in the case where a change in posture or an action is to be detected which accompanies a greater change of the gyro representative dispersion value than a change of the acceleration representative dispersion value, it is preferred to use the detection output of the rotation angular velocity sensor 33 as well as that of the acceleration sensor 23. That is, the information from the acceleration sensor 23 is primarily important at the time of standstill/low-speed motion or movement made up of many translational motion components, and conversely, the information from the rotation angular velocity sensor 33 is important at the time of high-speed motion or movement made up of may rotational motion components. Therefore, in the case where an action to be detected is high-speed motion or is made up of many rotational motion components, the time for using the information from the rotation angular velocity sensor 33 may be increased.

Next, at step SP5, the CPU 11 discriminates whether the specific information is a characteristic of "being in action on the ground" or not. If the result is positive, the CPU 11 proceeds to step SP6 to recognize the robot device 1 as being in action on the ground. After controlling the respective CPC devices such as the first CPC device 20 so that the robot device 1 keeps walking, the CPU 11 returns to step SP1.

Figure 7:
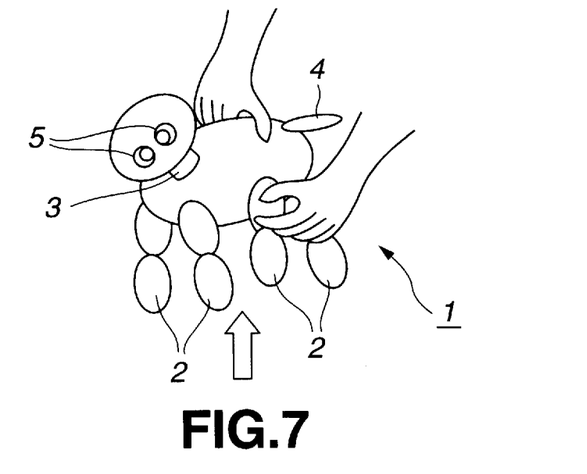
FIG. 7 is a schematic view for explaining the state where the robot device is lifted up.

On the other hand, if the result is negative at step SP5, the CPU 11 proceeds to step SP7 to discriminate whether the specific information is a characteristic of "being taken up" or not. If the result is positive, the CPU 11 proceeds to step SP8. In this case, the robot device 1 is taken up by the user as shown in FIG. 7.

The CPU 11 then recognizes the robot device 1 as being taken put at step SP8. After controlling the respective CPC devices such as the first CPC device 20 so that the robot device 1 stops walking and becomes static, the CPU 11 returns to step SP1.

If the result is negative at step SP7, the CPU 11 proceeds to step SP9 to discriminate whether the specific information is a characteristic of "being put down" or not. If the result is positive, the CPU 11 proceeds to step SP10. If the result is negative, the CPU 11 returns to step SP1.

Figure 8:
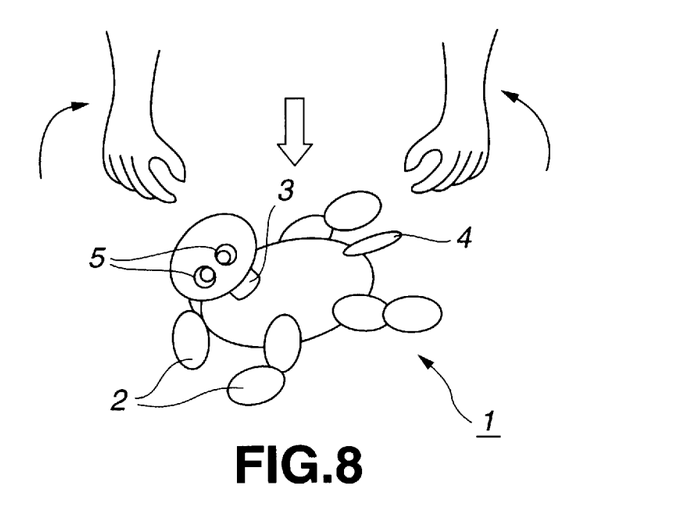
FIG. 8 is a schematic view for explaining the state where the robot is put down.
Figure 9:
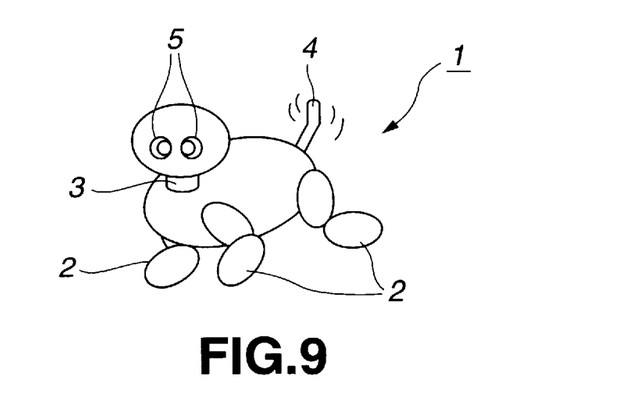
FIG. 9 is a schematic view for explaining the state where the robot device has resumed walking.

If the CPU 11 proceeds to step SP10, the CPU 11 recognizes the robot device 1 as being put down. After that, when it is recognized from the detection output of the touch sensor 44 that the robot device 1 is put on the ground, as shown in FIG. 8, the CPU 11 controls the respective CPC devices such as the first CPC device 20 so that the robot device 1 resumes walking as shown in FIG. 9, and then returns to step SP1.

The touch sensor 44 is a contact sensor for detecting the contact with the outside or a pressure-sensitive sensor for sensing the pressure. The touch sensor 44 detects the contact state with the ground (floor surface). By thus employing the means for recognizing the state of the robot device which is taken up, on the basis of the acceleration from the acceleration sensor and the rotation angular velocity from the gyro sensor and also with reference to the detection result of the detection means for detecting the contact state with the ground, a more reliable recognition result can be obtained.

That is, for example, in the case where the robot device is taken up, the tips of the limbs are detached from the ground and therefore the contact switches of the tips of the limbs are necessarily off. Therefore, by monitoring this information as well as the changes of acceleration and rotation angular velocity, the ability to detect the taking up or putting down of the robot device can be improved.

Figure 10:
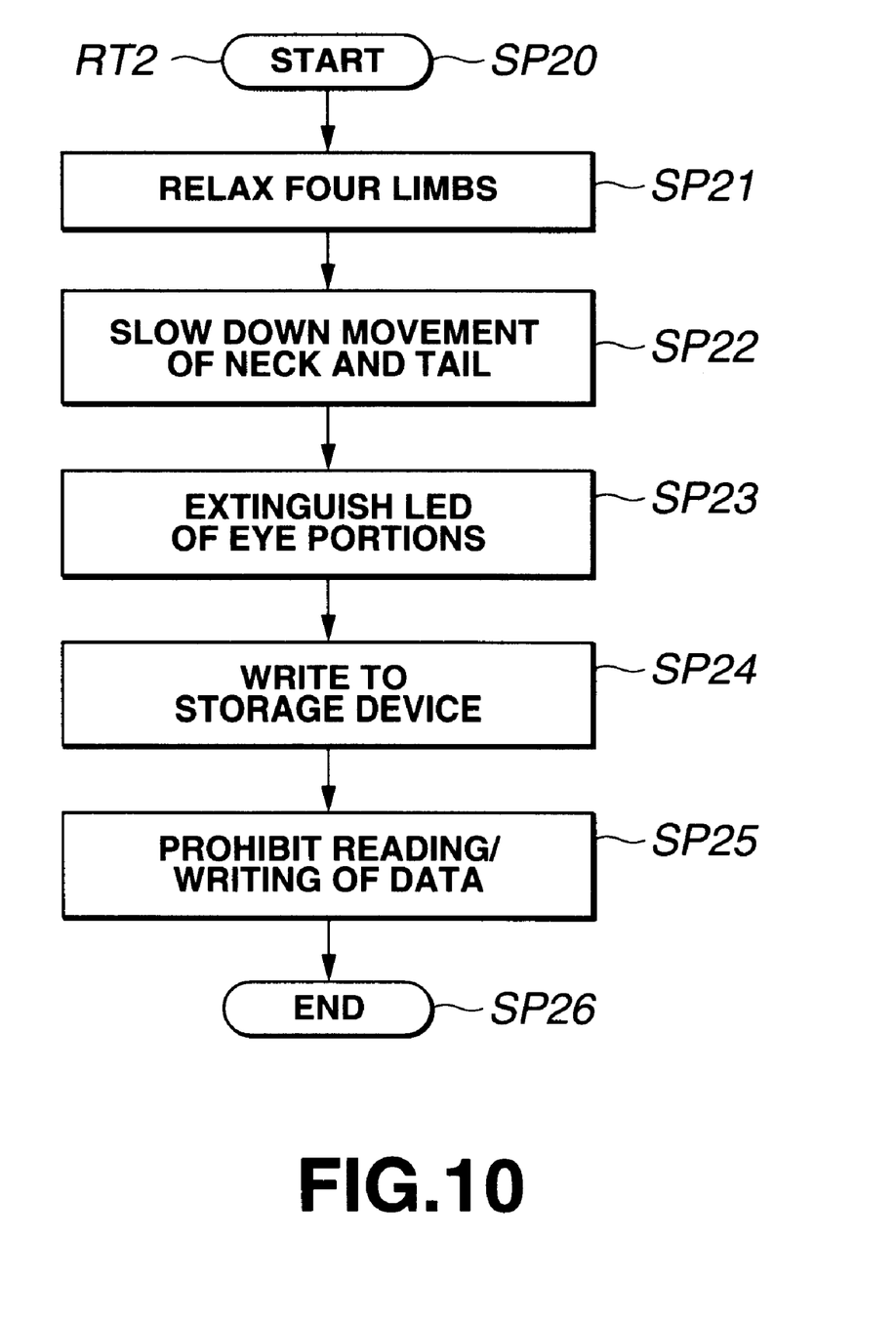
FIG. 10 is a flowchart illustrating the operation restraint processing procedure.

(2) Specific Processing of CPU 11 in Recognition of Taking Up and Putting Down When the robot device 1 is taken up, the CPU 11 restrains the operation of the robot device 1 in accordance with the operation restraint processing procedure RT2 shown in FIG. 10.

Specifically, on recognizing at step SP1 of the state recognition processing procedure RT1 that the robot device 1 is taken up, the CPU 11 starts the operation restraint processing procedure RT2 at step SP20 and controls the circuit of the corresponding servo system and the corresponding CPC device in the LSI 14 at step SP21, so as to stop the movement of the respective limbs 2 of the robot device 1 (i.e., setting the control gain to "0" with respect to the actuator 25 of the corresponding joint mechanism) and to release the mechanical constraint of the respective limbs 2, thus relaxing the limbs 2.

Figure 11A:
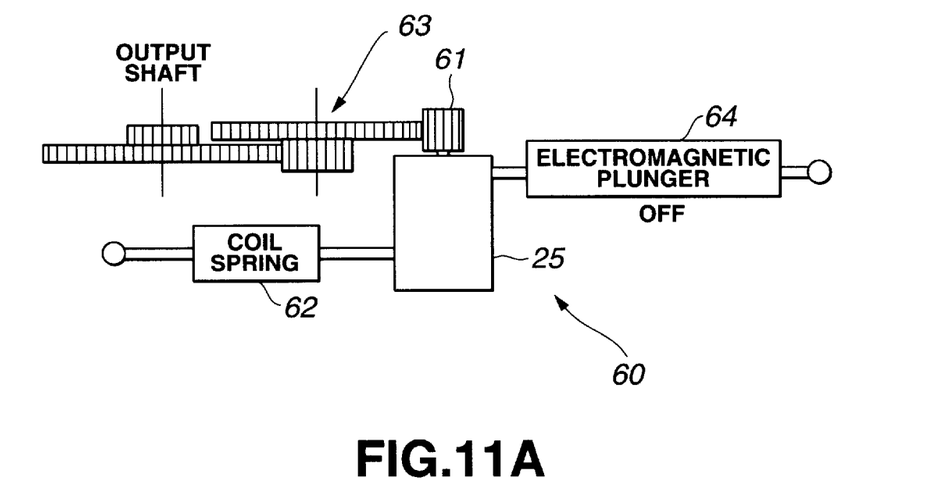
FIGS. 11A and 11B are schematic views showing joint mechanisms of limbs.
Figure 11B:
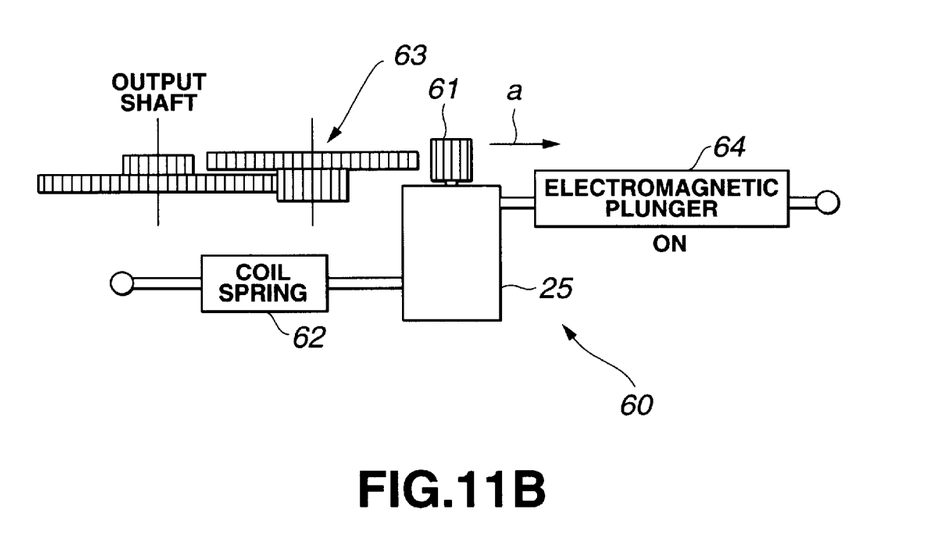

In reality, in this robot device 1, each joint mechanism 60 of each limb 2 is constituted by meshing a gear fixed to the output shaft of the actuator (motor) 25 with a deceleration gear array 63 by the elastic force of a compression coil spring 62, as shown in FIG. 11A. In this case, the actuator 25 can move in the direction of arrow a as shown in FIG. 11B by driving an electromagnetic plunger 64, and thus releasing the meshing between the gear 61 and the deceleration gear array 63.

At step SP21, the CPU 11 stops applying a driving current with respect to the actuator of all the joint mechanism of each limb 2 and drives the corresponding electromagnetic plunger 64 so as to release the mechanical constraint of each limb 2 due to the static torque of the actuator 25. Thus, all the limbs 2 of the robot device 1 are relaxed so that the user can easily hold the robot device 1.

Next, at step SP22, the CPU 11 controls the circuit of the corresponding servo system in the LSI 14 so as to slow down the movement of the neck 3 (FIG. 2) and the tail 4 (FIG.2). Then, at step SP23, the CPU 11 controls the corresponding circuit in the LSI 14 so as to extinguish the LED 5 (FIG. 2), which serves as "eyes", and to reduce the volume of the audio output (sound) from the speaker 53 (FIG. 1).

Next, at step SP24, the CPU 11 writes data including the state held at that time and various parameters related to learning to the storage device 200 via the PC card interface 15.

At step SP25, the CPU 1 prohibits subsequent reading/writing of data from/to the storage device 200. After that, at step SP26, the CPU 11 ends the operation restraint processing procedure RT2 and then returns to step SP1 of the state recognition processing procedure RT1.

Figure 12:
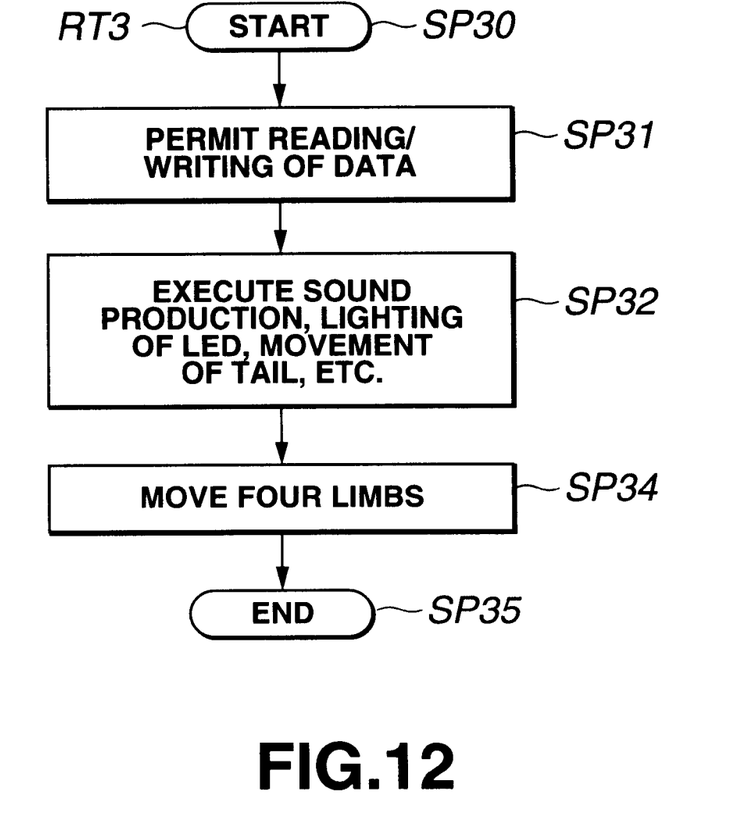
FIG. 12 is a flowchart illustrating the action restoration processing procedure.

When the robot device 1 is subsequently put down, the CPU 11 restores the action of the robot device 1 in accordance with the action restoration processing procedure RT3 shown in FIG. 12.

Specifically, on recognizing that the robot device 1 is put down at step SP 10 of the state recognition processing procedure RT1, the CPU 11 starts the action restoration processing procedure RT3 at step SP30. At the subsequent step SP31, the CPU issues permission of reading/writing of data from/to the storage device 200. The CPU 11 also controls the corresponding CPC device, mechanically constraining each limb 2 (i.e., stopping the driving of the electromagnetic plunger 64 of FIG. 11).

Next, at step SP32, the CPU 11 controls the corresponding circuit in the LSI 14 so as to output a sound of a predetermined pattern from the speaker 53 (FIG. 1) and to light the LED 5 corresponding to "eyes" and/or operate the tail 4, thus notifying the user of the restoration of action.

At step SP34, the CPU 11 reads out necessary data from the storage device 200 and controls the circuit of the corresponding servo system in the LSI 14 on the basis of the data so as to resume the operation of each limb 2. After that, at step SP35, the CPU 11 ends the action restoration processing procedure RT3 and then returns to step SP1 of the state recognition processing procedure RT1.

(3) Operation and Effect of Present Embodiment

In the robot device 1 of the above-described structure, the acceleration information and/or the rotation angular velocity information detected by the acceleration sensor 23 and/or the rotation angular velocity sensor 33 are stored into the storage section 13 in time series, and specific information such the dispersion value is calculated on the basis of the acceleration information and/or rotation angular velocity information. The robot device 1 recognizes its own state on the basis of the detection results and acts in accordance with the recognition result.

Therefore, in this robot device 1, it is not necessary to explicitly provide information about taking up and putting down of the robot device 1 by the user. As the robot device 1 is enabled to automatically recognize itself, more natural interaction between the robot and the human being can be realized.

In the case where an external force is applied to the robot device 1 from the ambient environment or a third party, since variation of specific information can be recognized, a reaction (output of action, sound or musical scale) corresponding to the external force can be made and the robot device 1 having a highly intelligent entertainment property can be constructed.

Since whether a target posture or action could be actually done or not can be determined with reference to specific information, the correctness of the action of the robot device 1 can be detected by such determination.

The operation of the robot device 1 is restrained by stopping the movement of each limb 2 or the like when the robot device 1 is taken up, but the action is restored by resuming the movement of each limb 2 when the robot device 1 is subsequently put down.

Therefore, in this robot device 1, occurrence of an injury to the user is prevented, for example, in the case where the user has his/her finger caught in the joint of the limb 2 of the robot device 1 or between the limb 2 and the body of the robot device 1 when the user takes up the robot device 1, or in the case where the user is surprised at the movement of the robot device 1 and drops the robot device 1 on his/her foot. At the same time, impressions of obedience and affinity are felt by the user who takes up the robot device 1 so that the use is more comfortable to the user.

Moreover, when this robot device 1 is taken up, reading/writing of data from/to the storage device 200 is prohibited. Therefore, damage to the data in the storage device 200 due to the dropping of the robot device 1 by the user at the time of reading/writing of data from to the storage device 200 and unauthorized data writing to the storage device 200 can be prevented.

With the above-described structure, the acceleration information and/or the rotation angular velocity information detected by the acceleration sensor 23 and/or the rotation angular velocity sensor 33 are stored into the storage section 13 in time series, and specific information such the dispersion value is calculated on the basis of the acceleration information and/or rotation angular velocity information. The robot device 1 recognizes its own state on the basis of the detection results and acts in accordance with the recognition result. Thus, it is possible to realize a robot device which can control its action in accordance with changes of its own state and which can thus easily recognize its own state such as movement on an inclined surface or a rotational motion and can acts by itself.

Since the operation of the robot device 1 is restrained when it is taken up, occurrence of an injury to the user due to the movement of the robot device 1 at the time of taking up can be prevented. Thus, it is possible to realize a robot device which enables improvement in safety and amusement property.

(4) Other Embodiments

In the above-described embodiment, the robot device 1 recognizes three states of the robot device 1 itself, that is, walking, being taken up, and being put down, on the basis of the dispersion value of the detection output of each sensor of the robot device 1. However, this invention is not limited the embodiment and the robot device may similarly recognize other patterns in the case where characteristics are found in the dispersion value and the frequency of the digital filter corresponding to the other patterns.

In the above-described embodiment, the dispersion value and the frequency characteristic outputted from the digital filter are used for calculation of specific information. However, this invention is not limited to the embodiment and other methods for calculating the characteristics corresponding to action patterns of the robot device 1 may be used, if any.

In the above-described embodiment, the dispersion value is used at step SP3 of the state recognition processing procedure RT1. However, this invention is not limited to the embodiment and the digital filter may be used with respect to the detection output of the acceleration sensor 23 and the rotation angular velocity sensor 33.

Practically, the digital filter is capable of taking out only a specific frequency component of time series signals. Therefore, by setting appropriate frequencies, a frequency component during the action of the robot device 1, a frequency component when the robot device 1 is taken up, and a frequency component when the robot device 1 is put down can be separated. As the qualitative relation of frequencies, the frequency during the action is the highest frequency, and the frequency when the robot device is taken up and the frequency when the robot device is put down are lower in this order.

Thus, by utilizing such characteristics in using the digital filter so as to set an appropriate threshold value similarly to the case where the dispersion value is used, the robot device 1 can recognize its own state.

In the above-described embodiment, the movement of each limb 2 is stopped when the robot device is taken up. However, this invention is not limited the embodiment and the posture of the robot device can be shifted to such a posture that the user can easily hold the robot device, for example, lying down with each limb 2 folded when the robot device is taken up. Thus, the comfortable feeling can be improved further.

In the above-described embodiment, the movement of each limb 2 is stopped when the robot device is taken up. However, this invention is not limited the embodiment. For example, in the case where this invention is applied to an amusement robot which learns and changes its character in accordance with the status of use by the user, the action pattern may be varied depending on the character when the robot device is taken up. Thus, the amusement property can be improved.

In the above-described embodiment, the movement of each limb 2 is stopped when the robot device is taken up. However, this invention is not limited the embodiment and it suffices to stop the movement of a movable part which acts to the outside and might cause an injury to the user, in accordance with the shape and mode of the robot device to which this invention is applied.

In the above-described embodiment, reading/writing of data from/to the storage device 200 is prohibited when the robot device is taken up. However, this invention is not limited the embodiment. For example, on the basis of the video data from the video camera 12, reading/writing of data from/to the storage device 200 may be prohibited also in the case where the risk of damaging the data in the storage device due to dropping or the like when reading/writing data from/to the storage device 200 is detected (for example, in the case where an edge like a cliff is detected in the direction of movement of itself).

Moreover, the detection of the state of the robot device by the acceleration sensor 23 is not limited to the above-described embodiment. For example, the state of the robot device can also be detected from the output of the acceleration sensor 23 as follows.

The time series signals with respect to the three direction of X-axis, Y-axis and Z-axis from the acceleration sensor 23 are sampled and stored as acceleration information.

When the acceleration information of a time series for a predetermined time period (hereinafter referred to as time series information) is stored, low-pass filtering is performed on each time series information of each axis so as to extract a low-frequency component. Then, the norm G(t) as a whole is calculated from the low-frequency component Gi (i=x, y, z) of each axis at a time point t in accordance with the following equation (1).

$$G(t)=\sqrt{Gx(t)^2+Gy(t)^2+Gz(t)^2} \quad (1)$$

Figure 13:
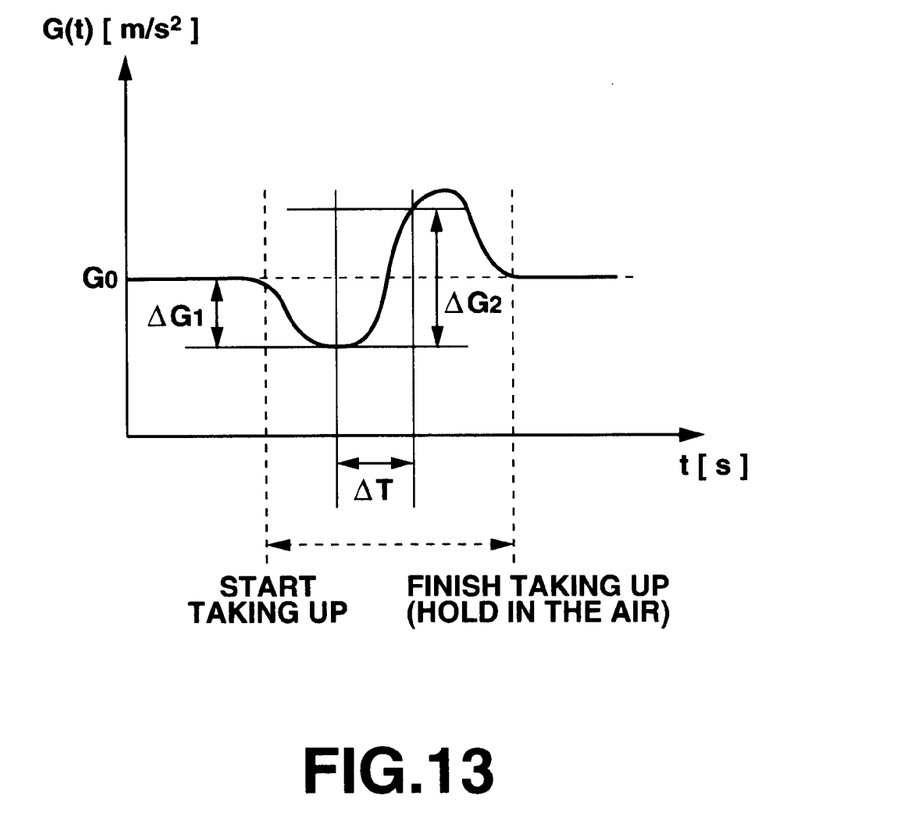
FIG. 13 is a graph for explaining the detection of the state using an acceleration sensor.

This G(t) presents characteristics as shown in FIG. 13 when the user takes up the robot device 1. Specifically, G(t) is lowered once from the normal value $G_0$, then abruptly exceeds the normal value $G_0$ and ultimately falls at the normal value $G_0$. By detecting such changes of G(t), the robot device 1 being taken up can be detected. Specifically, the robot device being taken up can be detected as follows.

The time point $T_0$ when the value calculated in accordance with the equation (2) reaches a certain threshold value (first threshold value) or higher, and G(t) at the time point $T_0$ (hereinafter referred to as $G_1$) are first stored. $G_0$ is the normal value, which is usually 9.8 (gravitational acceleration).

$$\Delta G_1 = G_0 - G(t) \quad (2)$$

Then, the value is calculated in accordance with the equation (3) within a predetermined time period $\Delta T$ from the time point $T_0$.

$$\Delta G_2 = G(t) - G_1 \quad (3)$$

When $\Delta G_2$ found by this equation (3) reaches a certain threshold value (second threshold value) or higher, it can be detected that the robot device is taken up.

In this case where the robot device thus detects its own state, it is a matter of course that the result of detection by the detection means for detecting the contact state with the ground can be referred to.

Industrial Applicability

According to the present invention, the acceleration and/or the rotation angular velocity are detected by the acceleration sensor and/or the gyro sensor, and the detected signals are stored in time series as time series signals. The specific information is calculated from the stored time series signals, and the state of the robot device itself is recognized from the calculated specific information. The action of the robot device is controlled on the basis of the recognized state of the robot device itself. Thus, a robot device which can easily recognize its own state such as shift on an inclined surface or rotational motion and can act by itself, and a method for controlling the same can be realized.

In addition, the operation of the movable part which acts to the outside is stopped if the recognized state is the state of being lifted up. Therefore, occurrence of an injury to the user due to the movement of the movable part which acts to the outside can be prevented. Thus, a robot device which enables improvement in safety and a method for controlling the same can be realized.

What is claimed is:

1. A robot device comprising:

detection means for detecting the acceleration and/or the rotation angular velocity by an acceleration sensor and/or a gyro sensor;

storage means for storing, in time series, signals detected by the detection means as time series signals;

calculation means for calculating specific information from the time series signals stored in the storage means;

recognition means for recognizing its own state from the specific information calculated by the calculation means; and output means for outputting an action based on its own state recognized by the recognition means.

2. The robot device as claimed in claim 1, wherein the calculation means calculates a dispersion value from the time series signals, and the recognition means recognizes its own state on the basis of the dispersion value calculated by the calculation means.

3. The robot device as claimed in claim 1, wherein the calculation means performs digital filtering on the time series signals to calculate a specific frequency component, and the recognition means recognizes its own state on the basis of the frequency component calculated by the calculation means.

4. The robot device as claimed in claim 1, wherein if its own state recognized by the recognition means is a state of being lifted up, the output means stops the operation of a predetermined movable part which acts to the outside.

5. The robot device as claimed in claim 1, wherein if its own state recognized by the recognition means is a state of being lifted up, the output means stops reading/writing of various information from/to external storage means.

6. The robot device as claimed in claim 1, wherein if its own state recognized by the recognition means is a state of being lifted up, the output means shifts the posture to such a posture that the user can easily hold the robot device.

7. The robot device as claimed in claim 1, further comprising contact state detection means for detecting the contact state with the ground, wherein the recognition means recognizes its own state on the basis of the result of detection by the contact state detection means.

8. A control method for a robot device comprising:

a first step of detecting the acceleration and/or the rotation angular velocity by an acceleration sensor and/or a gyro sensor;

a second step of storing, in time series, signals obtained by detection as time series signals;

a third step of calculating specific information from the stored time series signals;

a fourth step of recognizing its own state from the calculated specific information; and a fifth step of controlling an action of the robot device on the basis of its own recognized state.

9. The control method for a robot device as claimed in claim 8, wherein at the third step, a dispersion value as the specific information is calculated from the stored time series signals, and at the fourth step, its own state is recognized on the basis of the calculated dispersion value.

10. The control method for a robot device as claimed in claim 8, wherein at the third step, digital filtering is performed on the stored time series signals to calculate a specific frequency component as the specific information, and at the fourth step, its own state is recognized on the basis of the calculated frequency component.

11. The control method for a robot device as claimed in claim 8, wherein at the fifth step, if its own recognized state is a state of being lifted up, the operation of a predetermined movable part which acts to the outside of the robot device is stopped.

12. The control method for a robot device as claimed in claim 8, wherein at the fifth step, if its own recognized state is a state of being lifted up, reading/writing of various information from/to external storage means is stopped.

13. The control method for a robot device as claimed in claim 8, wherein at the fifth step, if its own recognized state is a state of being lifted up, the posture of the robot device is shifted to such a posture that the user can easily hold the robot device.

14. The control method for a robot device as claimed in claim 8, wherein at the fourth step, the contact state with the ground is detected and its own state is recognized on the basis of the result of detection.

* * * * *